(12) United States Patent
Wang et al.

(10) Patent No.: US 9,954,304 B2
(45) Date of Patent: Apr. 24, 2018

(54) PACKING ATTACHMENT STRUCTURE AND PACKING

(71) Applicant: Yazaki Corporation, Minato-ku, Tokyo (JP)

(72) Inventors: Feng Wang, Kakegawa (JP); Akira Kawamura, Kakegawa (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 14/397,413

(22) PCT Filed: Apr. 30, 2013

(86) PCT No.: PCT/JP2013/002885
§ 371 (c)(1),
(2) Date: Oct. 27, 2014

(87) PCT Pub. No.: WO2013/168393
PCT Pub. Date: Nov. 14, 2013

(65) Prior Publication Data
US 2015/0325947 A1 Nov. 12, 2015

(30) Foreign Application Priority Data
May 10, 2012 (JP) .................... 2012-108338

(51) Int. Cl.
*H02G 15/04* (2006.01)
*H01R 13/52* (2006.01)
(Continued)

(52) U.S. Cl.
CPC .......... *H01R 13/5219* (2013.01); *F16J 15/06* (2013.01); *H01R 13/5202* (2013.01); *H01R 2105/00* (2013.01)

(58) Field of Classification Search
CPC ............ H01R 13/5219; H01R 13/5202; H01R 2105/00; F16J 15/06
(Continued)

(56) References Cited

U.S. PATENT DOCUMENTS

| 5,879,178 A | * | 3/1999 | Koumatsu et al. ........... 439/271 |
| 2002/0031949 A1 | * | 3/2002 | Miyazaki ............. H01R 13/748 |
| | | | 439/625 |

(Continued)

FOREIGN PATENT DOCUMENTS

| EP | 1 081 805 A2 | 3/2001 |
| EP | 2 107 280 A1 | 10/2009 |

(Continued)

OTHER PUBLICATIONS

International Search Report of PCT/JP2013/002885 dated Aug. 7, 2013 [PCT/ISA/210].

(Continued)

*Primary Examiner* — Nathan Cumar
(74) *Attorney, Agent, or Firm* — Sughrue Mion, PLLC

(57) ABSTRACT

In a packing attachment structure, a packing accommodating recess includes an annular body and an engagement part projecting from the body on a plane of a front face of a flange part and in an one-plane direction of the front face. A packing includes an annular body and a to-be-engaged part projecting from the body. In arrangement, the body of the packing is accommodated in the body of the packing accommodating recess, while the to-be-engaged part of the packing is engaged with the engagement part of the packing accommodating recess.

3 Claims, 13 Drawing Sheets

(51) Int. Cl.
*F16J 15/06* (2006.01)
*H01R 105/00* (2006.01)

(58) Field of Classification Search
USPC ........ 277/616, 590, 602; 439/548, 556, 559, 439/564
See application file for complete search history.

(56) References Cited

U.S. PATENT DOCUMENTS

| | | | | |
|---|---|---|---|---|
| 2004/0214464 A1* | 10/2004 | Fukushima et al. | ........... | 439/271 |
| 2006/0273277 A1* | 12/2006 | Heller | ............... | H01J 37/32495 |
| | | | | 251/334 |
| 2007/0184701 A1* | 8/2007 | Yagome | ............... | H01R 13/506 |
| | | | | 439/271 |
| 2009/0243229 A1* | 10/2009 | Yoshida | ................. | F16J 15/061 |
| | | | | 277/596 |
| 2011/0195603 A1* | 8/2011 | Fujiwara | ............ | H01R 13/6596 |
| | | | | 439/607.28 |
| 2011/0230086 A1* | 9/2011 | Fujiwara | ............ | H01R 13/5202 |
| | | | | 439/559 |

FOREIGN PATENT DOCUMENTS

| | | | |
|---|---|---|---|
| EP | 2 367 236 A1 | | 9/2011 |
| JP | 09-112699 A | | 5/1997 |
| JP | 09112699 | * | 5/1997 |
| JP | 2974122 B2 | | 11/1999 |
| JP | 2007-207681 A | | 8/2007 |

OTHER PUBLICATIONS

Written Opinion of PCT/JP2013/002885 dated Aug. 7, 2013 [PCT/ISA/237].
Communication dated Jan. 12, 2016 from the Japanese Patent Office in counterpart application No. 2012-108338.
Communication dated Nov. 4, 2015, issued by the Japan Patent Office in corresponding Japanese Application No. 2012-108338.

* cited by examiner

[Fig. 1]
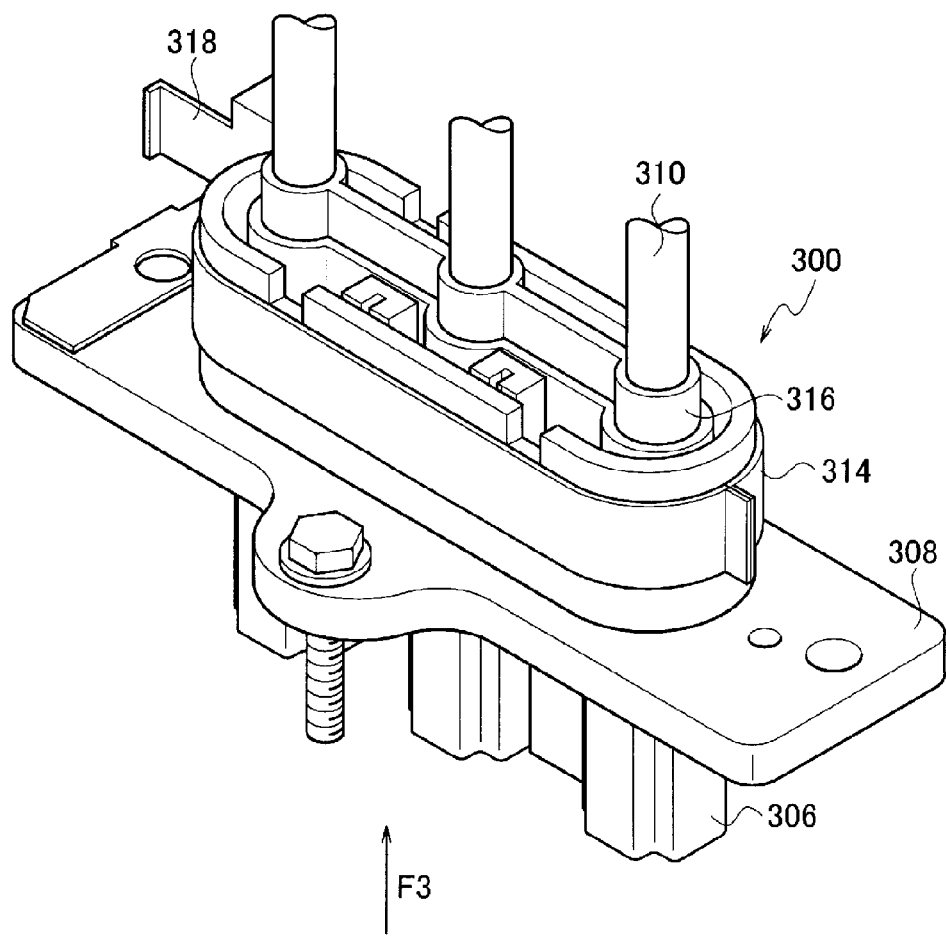

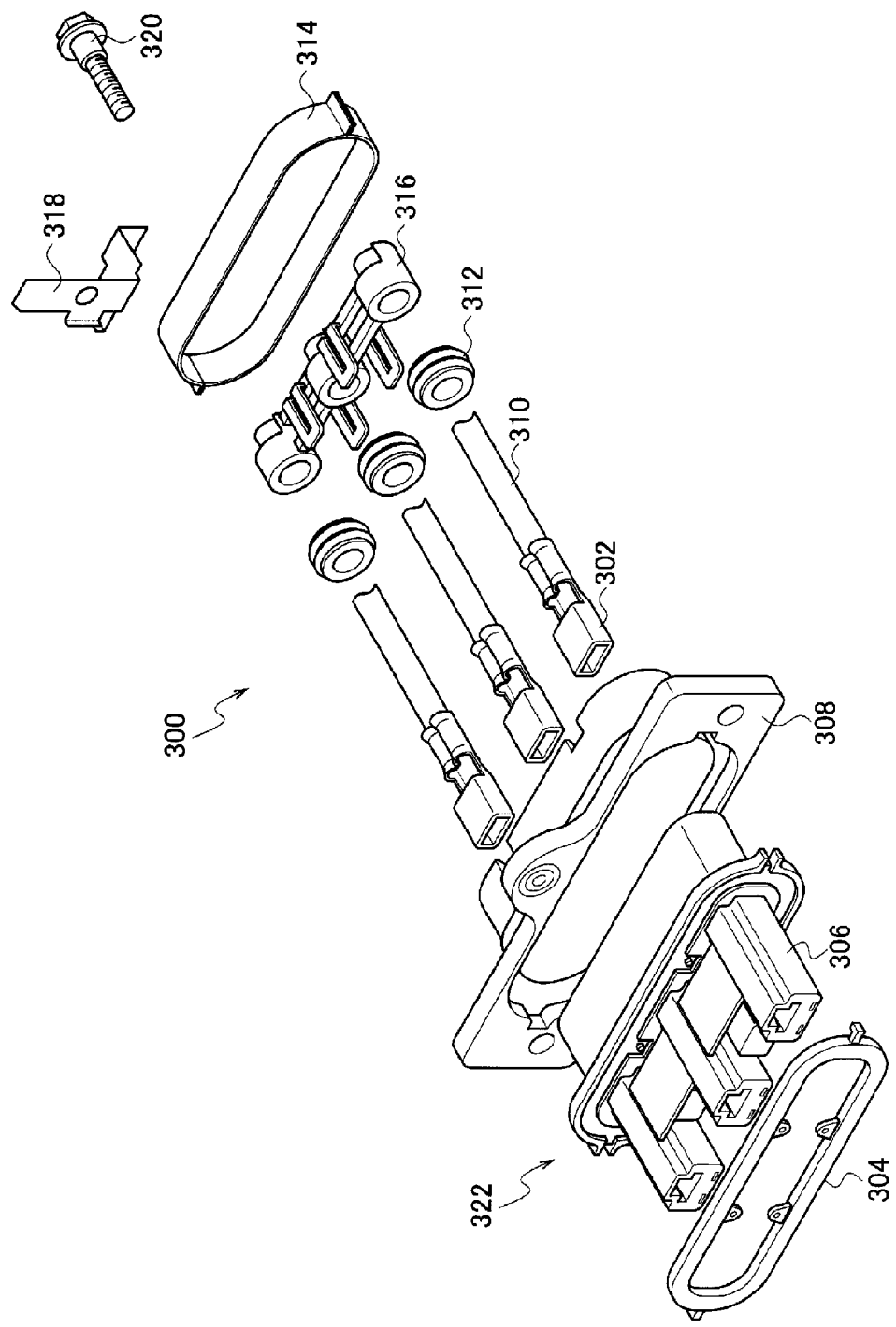
[Fig. 2]

[Fig. 3]
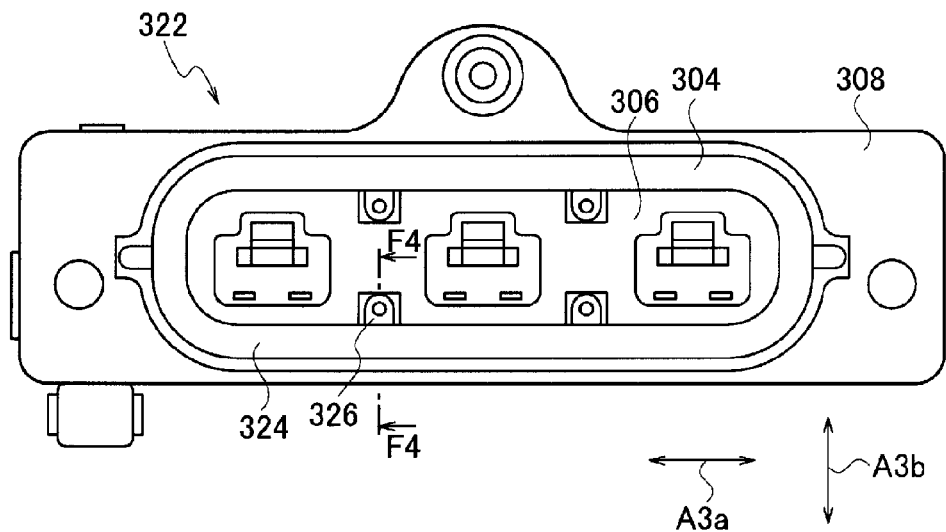
[Fig. 4]
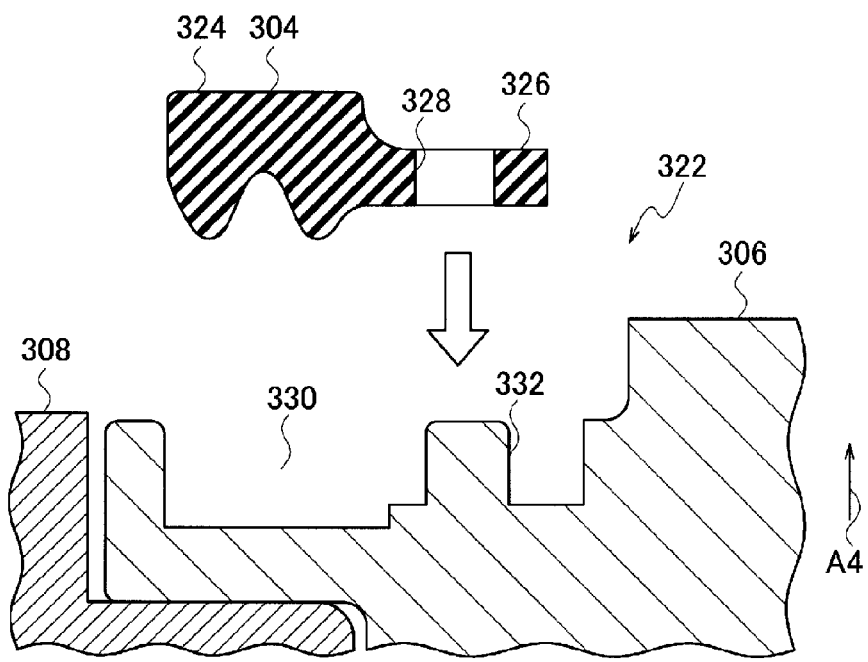

[Fig. 5]
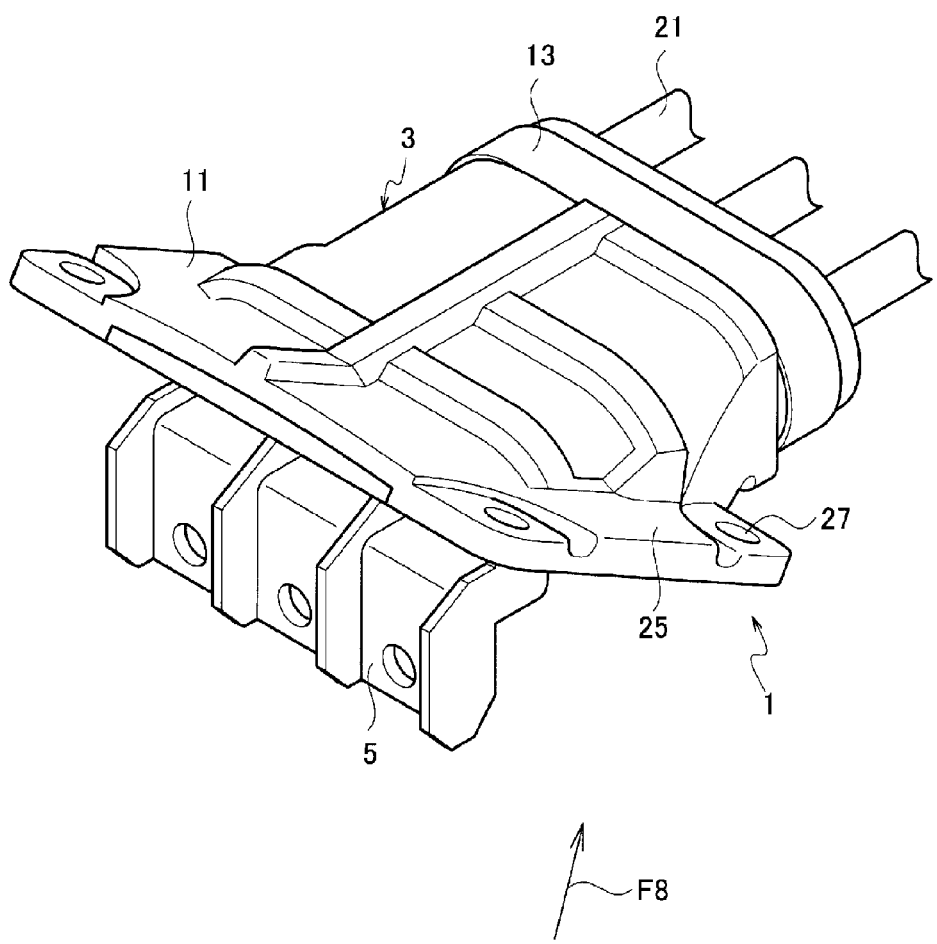

[Fig. 6]
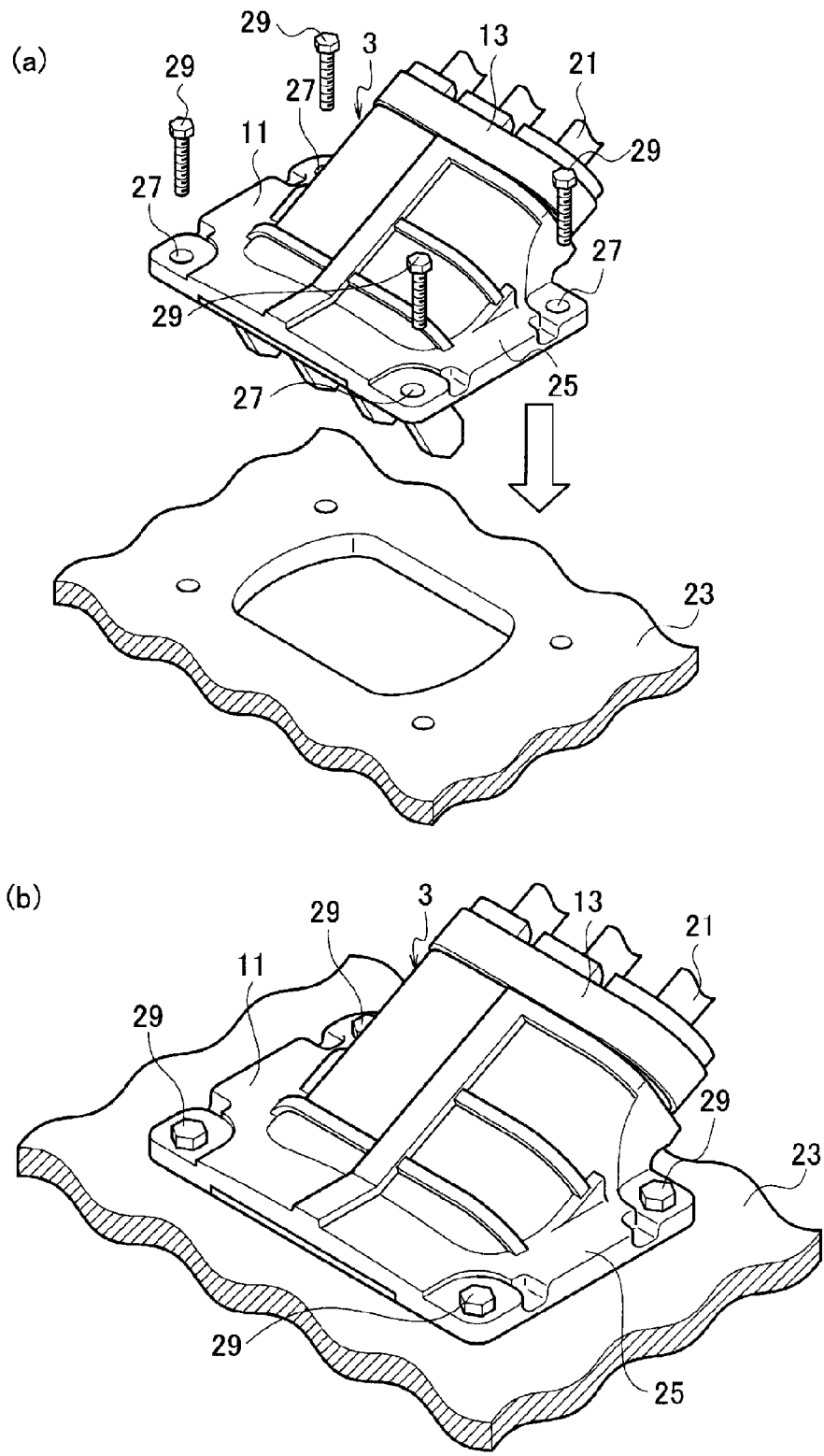

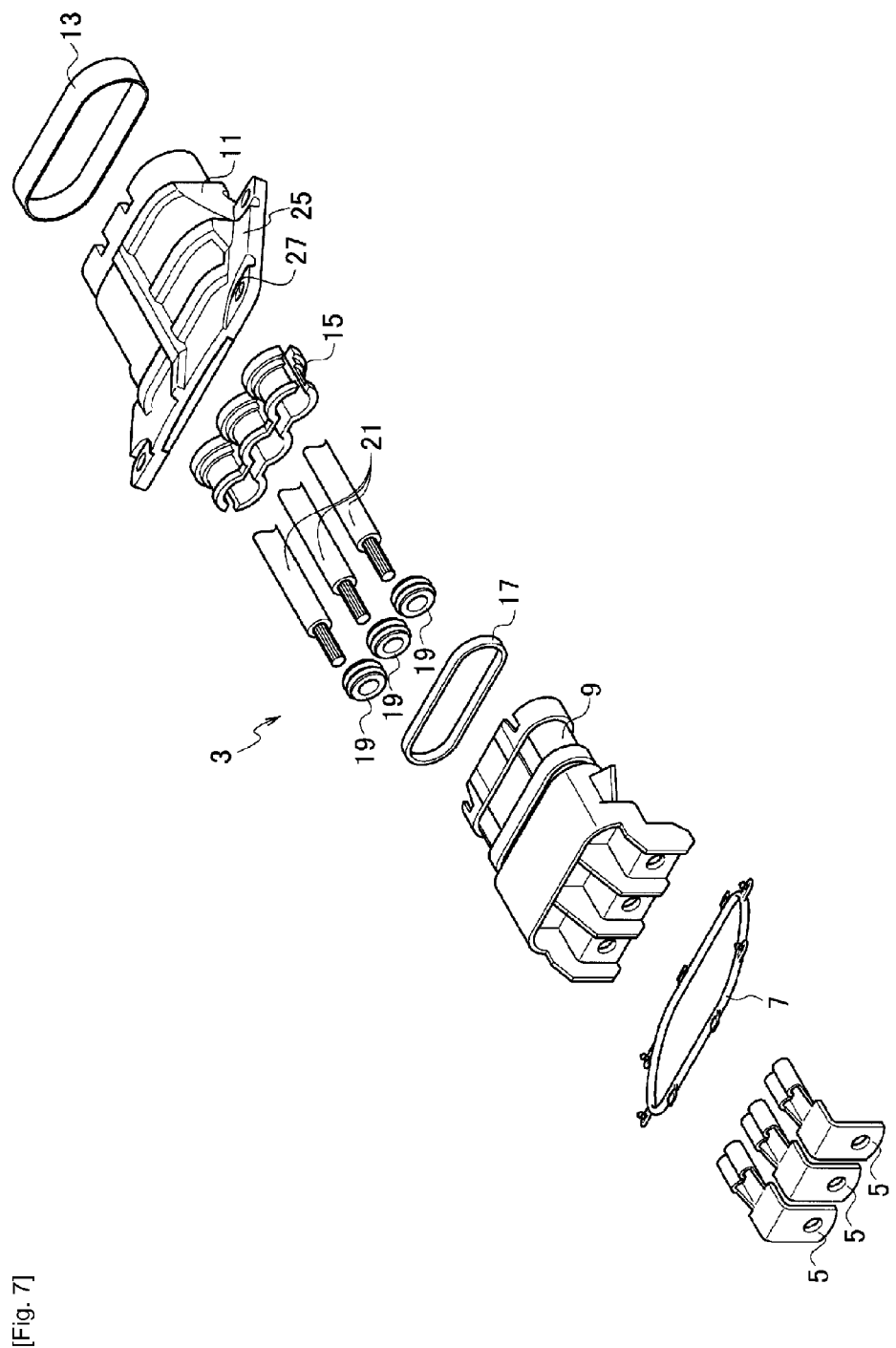
[Fig. 7]

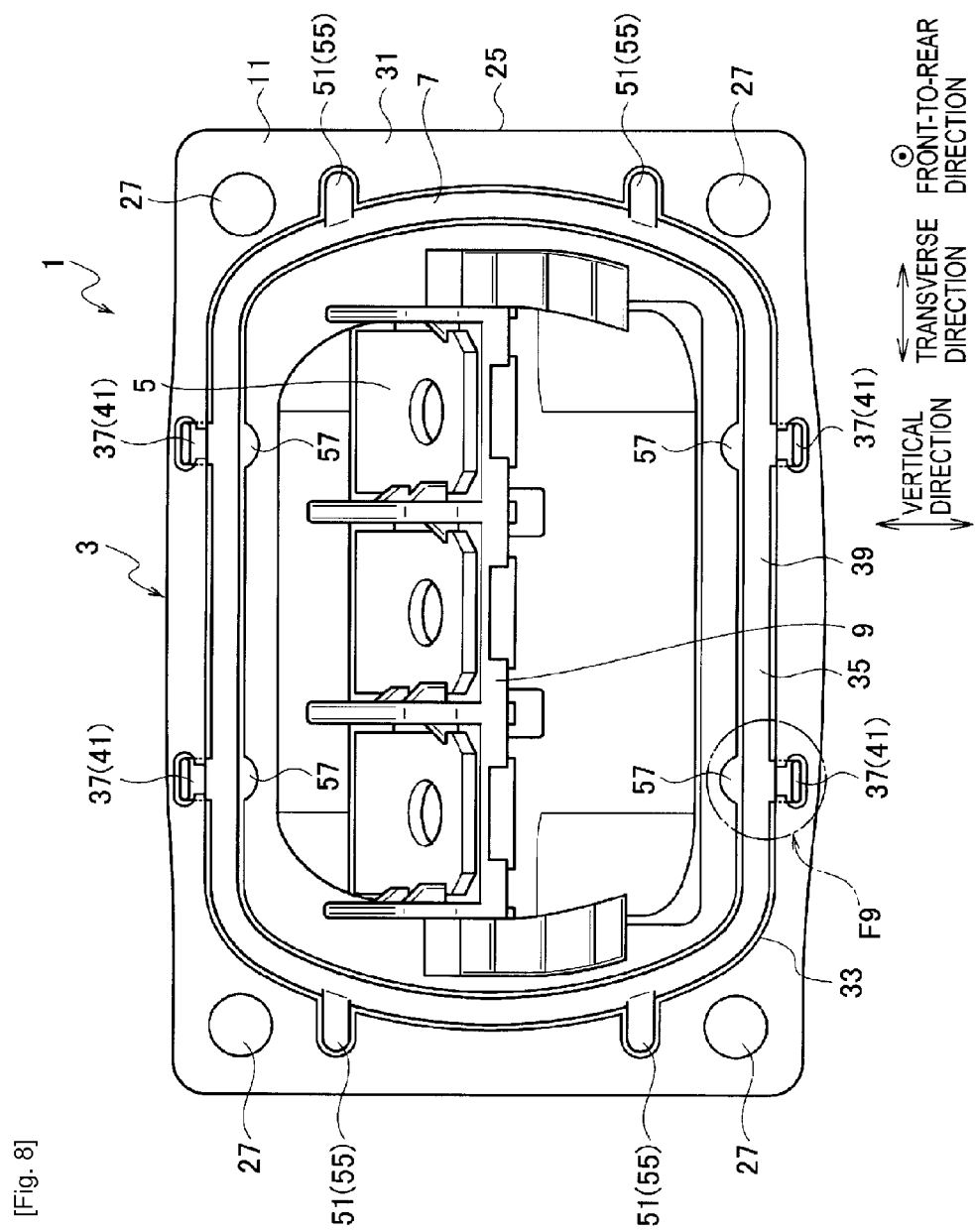
[Fig. 8]

[Fig. 9]
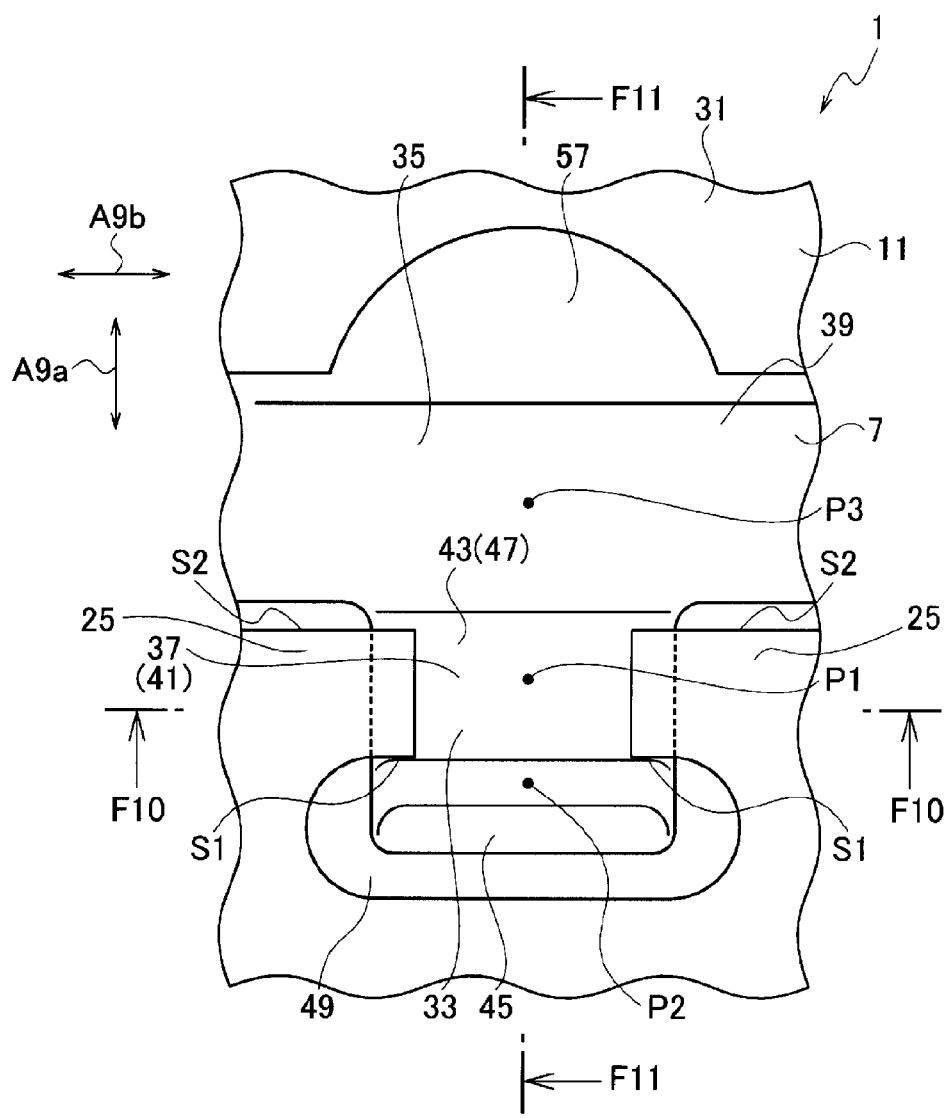

[Fig. 10]
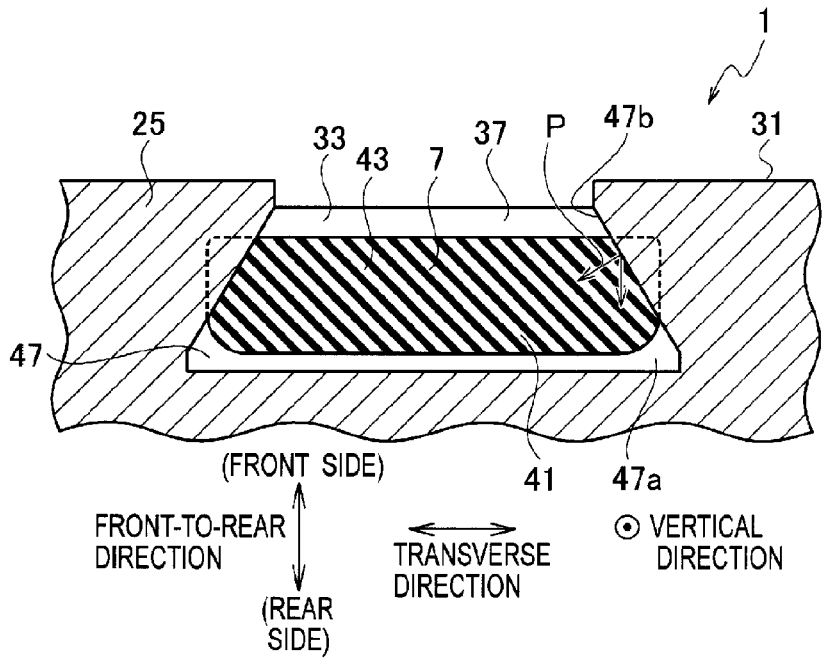
[Fig. 11]
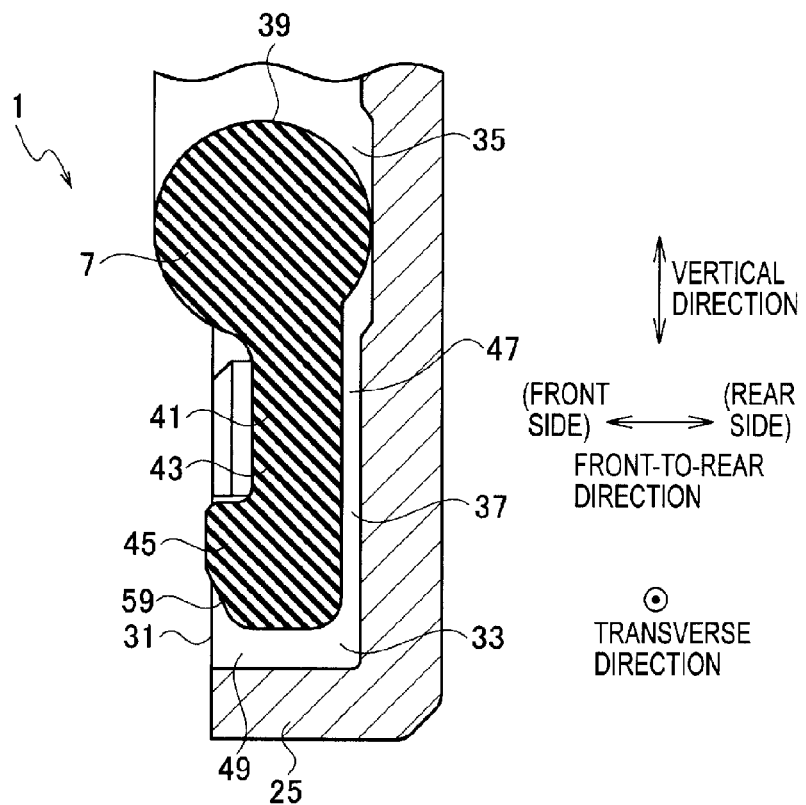

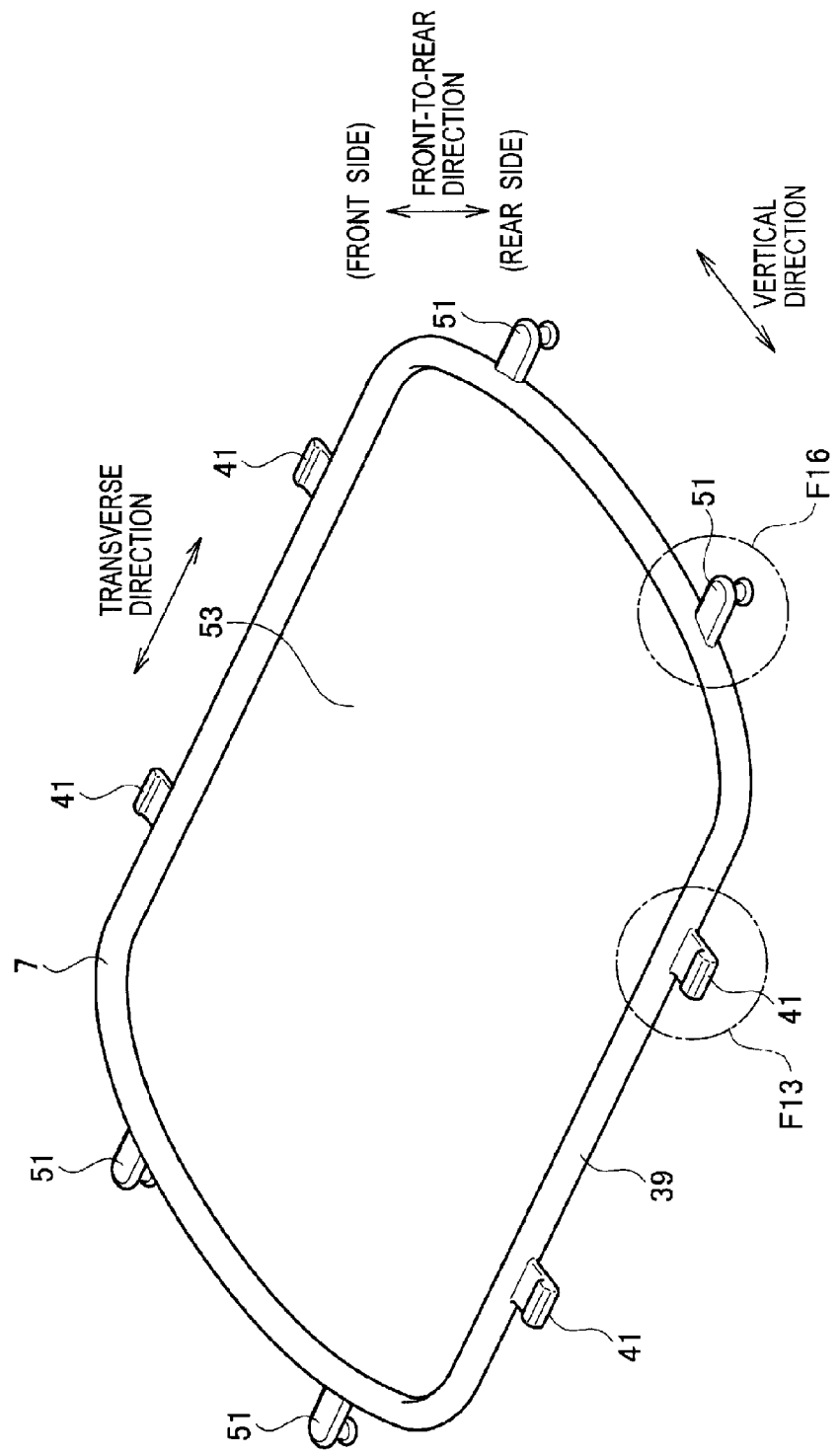

[Fig. 13]
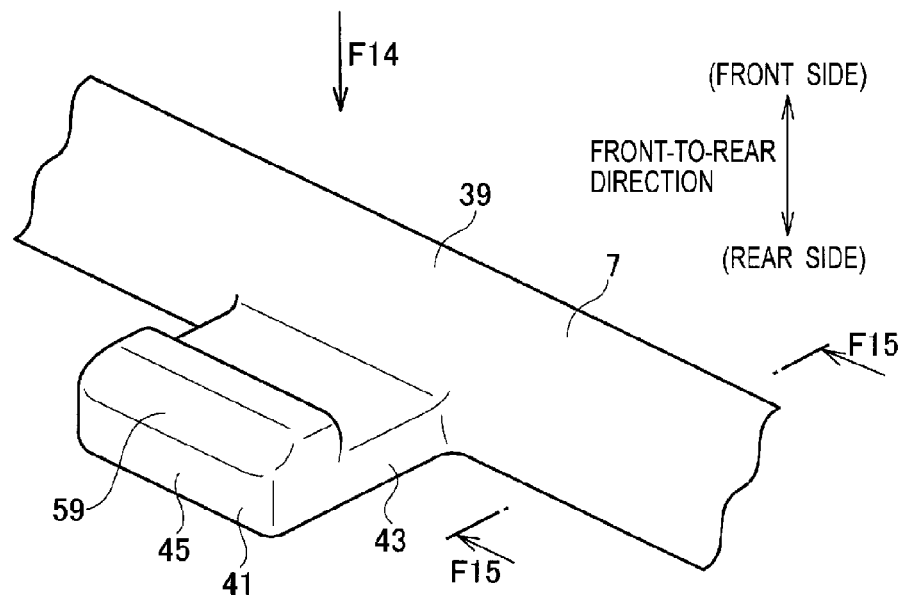
[Fig. 14]
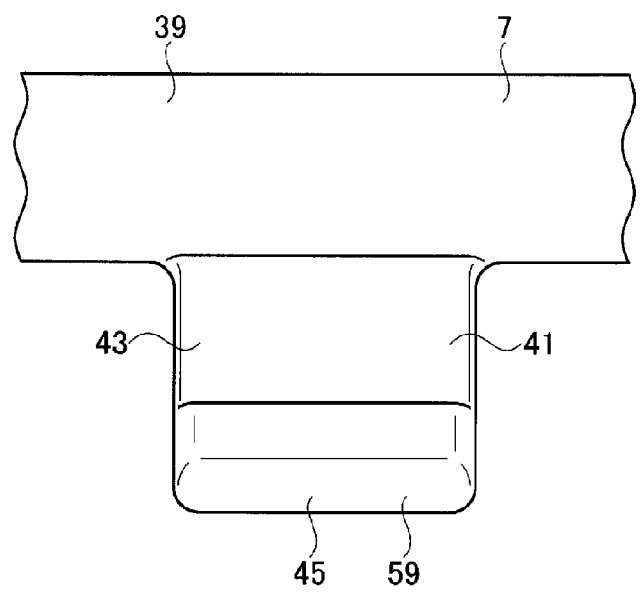

[Fig. 15]
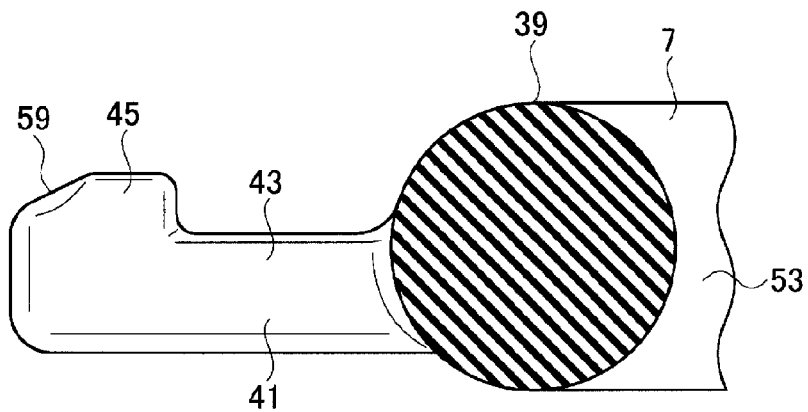
[Fig. 16]
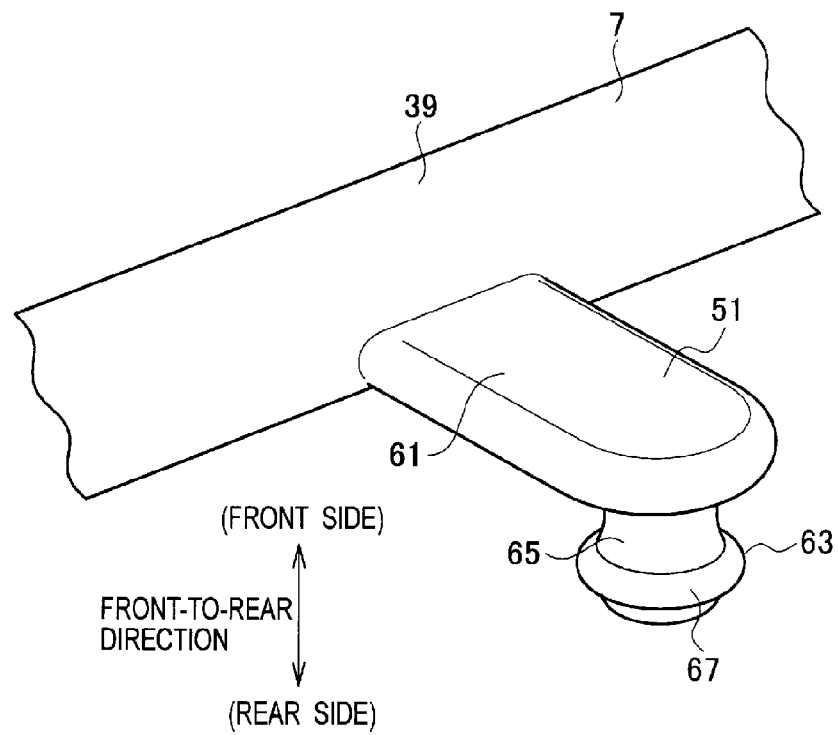

[Fig. 17]
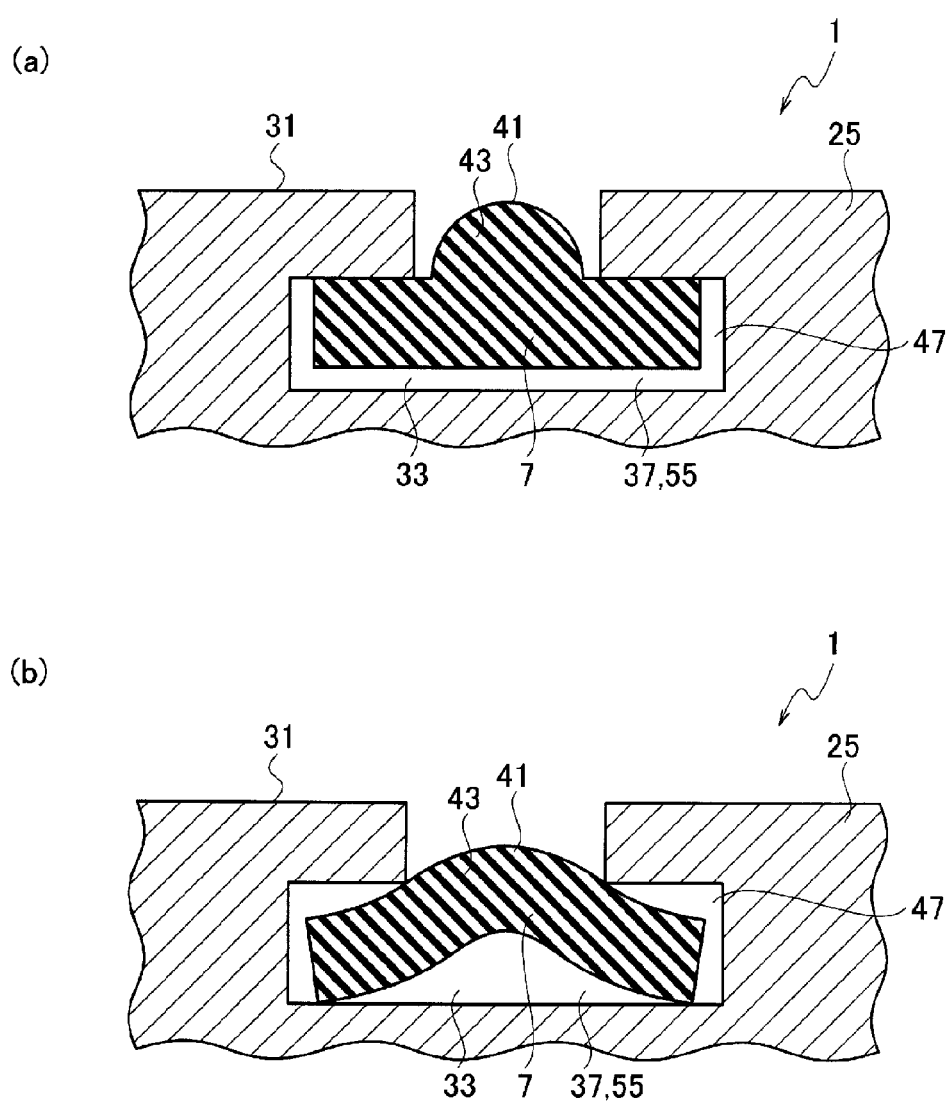

PACKING ATTACHMENT STRUCTURE AND PACKING

CROSS REFERENCE TO RELATED APPLICATIONS

This application is a National Stage of International Application No. PCT/JP2013/002885, filed Apr. 30, 2013, claiming priority based on Japanese Patent Application No. 2012-108338, filed May 10, 2012, the contents of all of which are incorporated herein by reference in their entirety.

TECHNICAL FIELD

The present invention relates to a packing attachment structure and a packing, more particularly, a structure constructed so that a to-be-engaged part of the packing is engaged with an engagement part of an attachment member.

BACKGROUND ART

Conventionally, as shown in FIGS. 1 and 2, a motor connector (connector) 300 includes a terminal 302 of a conductive part of a strong electric circuit, a packing (packing) 304 for establishing a waterproof function against a casing (i.e. not-shown motor casing), a housing 306 having an insulating function, a shell 308 having a function of a shield member, a rubber plug 312 for providing a waterproof function between a wire 310 and the housing 306, a shield ring 314 for crimping a braided wire of the wire 310 and the shell 308 to form a shield circuit, a rear holder 316 having a function of preventing the rubber plug 312 from falling out, a hide plate 318 for covering a bolt attached to the casing and an assist bolt 320 to be used when inserting or taking out the connector.

In a conventional packing attachment structure 322, respective joint surfaces of the above casing and the housing 306 are sealed each other with use of the packing 304 installed on the housing 306. That is, the annular packing 304 is waterproofed on its interior side.

Note, for example, that Patent Literature 1 (Japanese Patent Publication Laid-open No. 2007-207681) is enumerated as one prior literature related to the conventional packing attachment structure.

CITATION LIST

Patent Literature

[PTL 1]
Japanese Patent Publication Laid-open No. 2007-207681

SUMMARY OF INVENTION

Technical Problem

In connectors for EV (electric vehicle), HEV (hybrid electric vehicle) and the like, meanwhile, a waterproof property is required necessarily (That is, a waterproof function is required). However, there is a possibility that a rubber product for fulfilling a waterproof function, such as packing, does not stay on a normal position since it has been detached or everted from the housing during transporting or assembling operation of the connector. Consequently, there is a case that a waterproof function cannot be ensured in such a connector.

Then, as shown in FIGS. 3 and 4, a projection 326 is provided in an annular body (i.e. body fulfilling a sealing function) 324 of the packing 304 and additionally, a through-hole 328 is formed in the projection 326. In the housing 306, meanwhile, a projection 332 is provided in a recess 330 for accommodating the packing 304.

Thus, the above structure is constructed so as to prevent a detachment or eversion of the above-mentioned packing 304 with the arrangement where the projection 332 penetrates through the through-hole 328 under condition that the packing 304 is placed in the housing 306.

In the conventional packing attachment structure 322, it is constructed so that the packing 304 hardly comes free from the housing 306 in directions shown with arrows A3$a$, A3$b$ of FIG. 3. On the other hand, as the projection 332 and the through-hole 328 are together shaped to be columnar, the packing 304 is easily detached from the housing 306 in a direction shown with arrow A4 of FIG. 4.

That is, the conventional packing attachment structure 322 is confronting a problem that the packing may be detached from the housing by an external force through an operator's finger etc. during transporting or assembling operation of the connector.

Under the above-mentioned problem, an object of the present invention is to provide a packing attachment structure and a packing, both of which can prevent the packing from being detached from a housing despite that the packing attachment structure or the packing is subjected to an external force through an operator's finger etc. during transporting or assembling operation of the connector.

Solution to Problem

According to a first aspect of the present invention, there is provided a packing attachment structure comprising: an attachment member to be abutted on a butt surface of a mating member, the attachment member having a flange part and a packing accommodating recess formed on a front face of the flange part; and a packing accommodated in the packing accommodating recess to seal a boundary between the mating member and the flange part, the packing made of elastic material, wherein the packing accommodating recess includes an annular body and an engagement part projecting from the body on a plane of the front face of the flange part and also in the one-plane direction of the front face of the flange part, the packing includes an annular body and a to-be-engaged part projecting from the body, and when the packing is accommodated in the packing accommodating recess, the body of the packing is accommodated in the body of the packing accommodating recess while the to-be-engaged part of the packing fits into the engagement part of the packing accommodating recess and then is engaged with the engagement part.

Under condition that the packing is accommodated in the packing accommodating recess, the packing attachment structure may be constructed so that a base-side portion of the to-be-engaged part of the packing is prevented from moving from the flange part forward.

In the packing attachment structure, the base-end portion of the engagement part of the packing accommodating recess may have a width that is wider at a deeper point in the packing accommodating recess and which is narrower at a shallower point in the packing accommodating recess.

According to a second aspect of the present invention, there is provided a packing comprising: a body formed annularly; and a plurality of to-be-engaged parts projecting from the body, wherein the to-be-engaged parts each includes a base-side portion and a tip-side portion whose cross section is larger than a cross section of the base-side portion, the respective to-be-engaged parts are spaced apart from each other in a longitudinal direction of the body, and the respective to-be-engaged parts are provided outside the body and on a plane of an opening face of the body.

Advantageous Effects of Invention

According to the first and second aspects of the present invention, there is achieved an effect of enabling a provision of a packing attachment structure and a packing, both of which can prevent the packing from being detached from a housing despite that the packing attachment structure or the packing is subjected to an external force through an operator's finger etc. during transporting or assembling operation of the connector.

BRIEF DESCRIPTION OF DRAWINGS

FIG. 1 is a perspective view of a connector adopting a conventional packing attachment structure.

FIG. 2 is an exploded perspective view of the connector adopting the conventional mounting structure.

FIG. 3 is a view of the connector in a direction of arrow F3 of FIG. 1.

FIG. 4 is a sectional view taken along a line F4-F4 of FIG. 3. Note, however that the packing is detached from a flange part.

FIG. 5 is a perspective view of a connector adopting a packing attachment structure in accordance with an embodiment of the present invention.

FIGS. 6(a) and (b) are perspective views showing a condition where the connector adopting the packing attachment structure related to the embodiment of the present invention is detached from a motor casing and a condition where the connector is attached to the motor casing, respectively.

FIG. 7 is an exploded perspective view of the connector adopting the packing attachment structure related to the embodiment of the present invention.

FIG. 8 is a view of the connector in a direction of arrow F8 of FIG. 5.

FIG. 9 is an enlarged view of a part F9 of FIG. 8.

FIG. 10 is a view showing a section taken along a line F10-F10 of FIG. 9.

FIG. 11 is a view showing a section taken along a line F11-F11 of FIG. 9.

FIG. 12 is a perspective view showing the schematic constitution of the packing adopted in the packing attachment structure related to the embodiment of the present invention.

FIG. 13 is an enlarged view of a part F13 of FIG. 12.

FIG. 14 is a view of the packing in a direction of arrow F14 of FIG. 13.

FIG. 15 is a view of the packing in a direction of arrows F15-F15 of FIG. 13.

FIG. 16 is an enlarged view of a part F16 of FIG. 12.

FIGS. 17(a) and 17(b) are views showing where a packing related to a modification is placed in a packing accommodating recess, corresponding to FIG. 10.

DESCRIPTION OF EMBODIMENTS

As shown in FIGS. 5, 6 and 7, a connector (e.g. motor connector) 3, which adopts a structure for mounting a packing (packing attachment structure) 1 related to an embodiment of the present invention, includes LA terminals 5, a packing (grommet) 7, a housing 9, a shell 11, a shield ring 13 and a rear holder 15.

The LA terminals 5 are arranged on conductive wires of electrical cables 21, serving as a conductive part of a strong electric circuit. The packing (first packing) 7 is constructed so as to fulfill a waterproof function between the shell 11 and the casing 23 under condition that the shell 11 is arranged on the casing (e.g. motor casing) 23 of FIG. 6.

The housing 9 is a member having an insulating function, while the shell 11 is a member having a function as a shield member. A packing (second packing) 17 is a member for ensuring the shield function between the housing 9 and the shell 11, while rubber plugs 19 are respective members for ensuring the shield function between the electrical cables 21 and the housing 9.

The shield ring 13 is a member for crimping braided wires of the electrical cables 21 and the shell 11 to form a shield circuit, while the rear holder 15 is a member for preventing the rubber plugs 19 from falling off the cables. By use of bolts 29 passing through through-holes 27 formed in a flange part 25 of the shell 11, the connector 3 is attached to the casing 23 integrally (see FIG. 5 and FIG. 6).

Here, we now describe the packing attachment structure (e.g. installation structure for a waterproof packing) 1 in detail, with reference to FIG. 8. For convenience of explanation, there may be provided definitions: one designated direction in the packing attachment structure 1 is defined as "transverse direction"; another designated direction perpendicular to the transverse direction is defined as "vertical direction"; and a direction perpendicular to the transverse direction and the vertical direction is defined as "front-to-rear direction".

In the packing attachment structure 1, the packing 7 made of elastic material, such as rubber, is accommodated in a packing accommodating recess 33. The packing accommodating recess 33 is formed in a front face 31 of the flange part 25 of the attachment member (e.g. metallic shell) 11 which is to be abutted on a butt surface of a mating member (e.g. metallic motor casing) 23. With this arrangement, the packing 7 seals a boundary between the mating member 23 and the flange part 25.

The butt surface of the mating member 23 and the front face 31 of the attachment member 11 extend in both the transverse direction and the vertical direction. In the front-to-rear direction, the attachment member 11 is positioned behind the mating member 23, while the packing accommodating recess 33 is recessed rearward from the front face 31 of the flange part 25.

The packing accommodating recess 33 includes an annular body 35 and engagement parts 37 formed on the front face 31 of the flange part 25 and also somewhat projecting from the body 35 in a direction on the front face 31 of the flange part 25, as shown in FIG. 8 etc. The projecting direction of the engagement parts 37 corresponds to the extending direction of the front face 31 (i.e. a direction perpendicular to the front-to-rear direction).

For instance, the front face 31 of the flange part 25 is shaped like a rectangular plane. Thus, when viewing the flange part 25 from its front side toward the rear side (viewing in the front-to-rear direction), the packing accommodating recess 33 is positioned on the inner side of the front face 31 of the flange part 25, apart from the outer circumference of the front face 31 of the flange part 25. Note, the through-holes 27 are positioned outside the packing accommodating recess 33.

As shown in FIGS. 8 and 12, the packing 7 includes the annular body 35 and to-be-engaged parts 41 somewhat projecting from the body 35.

Then, under condition that the packing 7 is accommodated in the packing accommodating recess 33 (i.e. installed condition: packing accommodating condition), the body 30 of the packing 7 is accommodated in the body 35 of the accommodating recess 33. The to-be-engaged parts 41 of the packing 7 fits into the engagement parts 37 of the packing accommodating recess 33 and engaged in the engagement parts 37, so that the to-be-engaged parts 41 are integrated with the flange part 25.

For further explanation, under condition that the packing 7 is accommodated in the packing accommodating recess 33 while the shell 11 is not attached to the casing 23 (i.e. condition that the connector 3 is existing independently, as shown in FIG. 6(a)), the body 39 of the packing 7 partially projects from the flange part 25 somewhat forward (see FIG. 11).

When the shell 11 is attached to the casing 23, the planar front face 31 of the flange part 25 of the shell 11 comes into surface contact with the planar butt surface of the casing 23. Thus, the body 39 of the packing 7 is pinched under pressure between the a bottom surface of the body 35 of the packing accommodating recess 33 and the butt surface of the casing 23 into elastic deformation, thus to seal a boundary between the casing 23 and the flange part 25 (the shell 11).

Note, under condition that the packing 7 is accommodated in the packing accommodating recess 33, the to-be-engaged parts 41 of the packing 7 are substantially accommodated in the engagement parts 37 of the packing accommodating recess 33 irrespective of whether the shell 11 is attached to the casing 23 or not. Then, different from the body 39 of the packing 7, the to-be-engaged parts 41 do not project forward from the front face 31 of the flange part 25 (see FIGS. 10 and 11).

Further, under condition that the to-be-engaged parts 41 of the packing 7 are engaged with the engagement parts 37 of the packing accommodating recess 33, the packing attachment structure is constructed so as to prevent the to-be-engaged parts 41 of the packing 7 from moving to the front side (movement toward the flange part 25) and also prevent the to-be-engaged parts 41 of the packing 7 from moving in the one-plane direction of front face 31 of the flange part 25 (movement toward the flange part 25).

As shown in FIG. 8, there are provided, for example, multiple engagement parts 37 and multiple to-be-engaged parts 41. In arrangement, the to-be-engaged parts 41 are engaged in the engagement parts 37, respectively.

The respective engagement parts 37 of the packing accommodating recess 33 are arranged at predetermined intervals in the longitudinal direction of the annular body 35 (extending direction of an annulus) of the packing accommodating recess 33. Similarly to the engagement parts 37 of the packing accommodating recess 33, the to-be-engaged parts 41 of the packing 7 are also arranged at predetermined intervals in the longitudinal direction of the annular body 39 of the packing 7 (see FIG. 12). That is, the annular body 39 of the packing 7 is shaped like an annulus resulting from a mutual connection between both longitudinal ends of an elongated cord-like member. Thus, the to-be-engaged parts 41 of the packing 7 are arranged at predetermined intervals in the longitudinal direction of the above cord-like member.

Again, the engagement parts 37 of the packing accommodating recess 33 (the to-be-engaged parts 41 of the packing 7) are arranged, for example, opposed to each other in the annular body 35 (39). That is, one or a group of engagement parts 37 (the to-be-engaged parts 41) are arranged on one side of the center of the body 35 (39), while the other or another group of engagement parts 37 (the to-be-engaged parts 41) are arranged on the other side of the center of the body 35 (39).

In the packing 7, under condition that the packing 7 is accommodated in the packing accommodating recess 33 and the shell 11 is then placed in the casing 11, the body 39 is adapted so as to fulfill a waterproof function. Thus, the packing 7 is formed so as to waterproof the interior side of the annular body 39.

The packing attachment structure 1 is constructed so that when the packing 7 is accommodated in the packing accommodating recess 33, a portion 43 of the to-be-engaged part 41 on the side of the base end (i.e. a packing to-be-engaged part base-side portion) is prevented from moving ahead of the flange part 25 (getting out of the packing accommodating recess 33).

To be specific, the to-be-engaged part 41 of the packing 7 comprises the portion 43 on the side of the base end and a portion on the side of the tip end (i.e. a packing to-be-engaged part tip-side portion) 45, as shown in FIG. 9 etc. The boundary between the base-side portion 43 and the tip-side portion 45 is present at an intermediate portion of the to-be-engaged part 41 in the projecting direction (vertical direction of FIG. 9) of the to-be-engaged part 41 of the packing 7. The base-side portion 43 is present between the boundary of the body 39 of the packing 7 and the to-be-engaged part 41 and the above intermediate portion. In the to-be-engaged part 41 of the packing 7, the tip-side portion 45 is present on the side of the tip end (lower side of FIG. 9) rather than the above intermediate portion.

Further, under condition that the packing 7 is accommodated in the packing accommodating recess 33, the packing attachment structure is constructed so as to prevent the whole to-be-engaged parts 41 of the packing 7 from moving in the direction on the plane of the front face 31 of the flange part 25.

In the packing attachment structure 1, additionally, the width of a portion (packing-accommodating-recess/engagement part base-side portion) 47 on the side of a base end of the engagement part 37 of the packing accommodating recess 33 is established to be wider at a deeper point 47a (underside point of FIG. 10) in the packing accommodating recess 33 and narrower at a shallower point 47b (upside point of FIG. 10) in the packing accommodating recess 33, as shown in FIG. 10.

More in detail, the engagement part 37 of the packing accommodating recess 33 is also formed by the base-side portion 47 and a tip-side portion (packing-accommodating-recess/engagement part tip-side portion) 49, as similar to the to-be-engaged part 41 of the packing 7.

Now, when viewing the structure in the front-to-rear direction, the engagement part 37 of the packing accommodating recess 33 is shaped (e.g. T-shaped profile) so that the tip-side portion 49 has a width (dimension in the horizontal direction of FIG. 9; dimension in the transverse direction) wider than the width of the base-side portion 47, as shown in FIG. 9. Here, the base-side portion 47 corresponds to a vertical line part of the T-shaped profile, while the lower end of the T-shaped profile is connected to the body 35 of the packing accommodating recess 33, and the tip-side 49 corresponds to a horizontal part of the T-shaped profile.

In the base-side portion 47 of the engagement part 37 of the packing accommodating recess 33, the width dimension (dimension in the horizontal direction of FIG. 10; dimension in the transverse direction) of the base-side portion 47 varies in the direction of this depth, as shown in FIG. 10. In the base-side portion 47, for instance, this width dimension is gradually widened as directing from the front side to the rear side (as directing from top to bottom of FIG. 10). Consequently, the base-side portion 47 is shaped like a dovetail groove.

In the base-side portion 47 of the engagement part 37 of the packing accommodating recess 33, additionally, the width of the dovetail groove at the front face 31 of the flange part 25 (width of the dovetail groove at the upper end of FIG. 10) is narrower than the width of the base-side portion 43 of the to-be-engaged part 41 of the packing 7, as shown in FIG. 10. The width of the dovetail groove at the bottom part (width of the dovetail groove at the lower end of FIG. 10) is larger than the width of the base-side portion 43 of the to-be-engaged part 41 of the packing 7. Note, the width of the base-side portion 47 of the engagement part 37 of the packing accommodating recess 33 is narrower than the width of the tip-side portion 49 of the engagement part 37.

In the tip-side portion 49 of the engagement part 37 of the packing accommodating recess 33, meanwhile, a portion's transverse dimension and a portion's vertical dimension are constant in this depth direction (in the front-to-rear direction).

Further, under condition that the packing 7 is accommodated in the packing accommodating recess 33, the base-side portion 43 of the to-be-engaged part 41 of the packing 7 gets into the base-side portion 47 of the engagement part 37 of the packing accommodating recess 33, as shown in FIG. 10. Moreover, the base-side portion 43 of the to-be-engaged part 41 of the packing 7 is pressed and elastically deformed by a wall of the base-side portion 47 at the shallower point 47b of the engagement part 37 of the packing accommodating recess 33, as shown with arrows P. As can be understood from FIGS. 9 and 10, the wall of the flange part 25 projects against the base-side portion 43 of the to-be-engaged part 41 of the packing 7.

In this way, the packing 7 is constructed so that the base-side portion 43 of the to-be-engaged part 41 does not get out of the engagement part 37 of the packing accommodating recess 33 (That is, the packing is constructed so that the same portion cannot move ahead of the flange part 25 easily).

Further, under condition that the packing 7 is accommodated in the packing accommodating recess 33, the tip-side portion 45 of the to-be-engaged part 41 of the packing 7 fits into the tip-side portion 49 of the engagement part 37 of the packing accommodating recess 33. The tip-side portion 45 of the to-be-engaged part 41 of the packing 7 is formed so as to swell against the front side and also engaged in the shallower point 47b of the base-side portion 47 of the engagement part 37 of the packing accommodating recess 33.

In this way, the packing 7 is constructed so that the to-be-engaged part 41 gets out of the engagement part 37 of the packing accommodating recess 33 more hardly.

More in detail, even if a force directing from the plane of paper of FIG. 9 to its near side is applied on the base-side portion 43 (P1) of the to-be-engaged part 41 of the packing 7, the base-side portion 43 is housed within the dovetail groove as shown in FIG. 10, so that the tip-side portion 45 of the to-be-engaged part 41 abuts on a surface S1 of the tip-side portion 49 of the engagement part 37, while the body 39 of the packing 7 abuts on a surface S2 of the body 35 of the packing accommodating recess 33. In this way, the packing 7 is constructed so that the base-side portion 43 of the to-be-engaged part 41 does not move in a direction from the plane of paper of FIG. 9 toward the near side (That is, the packing is constructed so that the same portion does not get out of the packing accommodating recess 33).

Similarly, the packing 7 is constructed so that even if a force directing from the plane of paper of FIG. 9 to the near side is applied on the tip-side portion 45 (P2) of the to-be-engaged part 41 of the packing 7, the tip-side portion 45 of the to-be-engaged part 41 would not move in the direction from the plane of paper of FIG. 9 toward the near side. Additionally, the packing 7 is constructed so that even if a force directing from the plane of paper of FIG. 9 to the near side is applied on the body 39 (P3) of the packing 7, the body 39 of the packing 7 does not move in the direction from the plane of paper of FIG. 9 toward the near side.

Additionally, if a force in the vertical direction of FIG. 9 (force in the direction of arrow A9a) is applied on the base-side portion 43 (P1) of the to-be-engaged part 41 of the packing 7, then the tip-side portion 45 of the to-be-engaged part 41 abuts on the surface S1 of the tip-side portion 49 of the engagement part 37, while the body 39 of the packing 7 abuts on the surface S2 of the body 35 of the packing accommodating recess 33. In this way, the packing 7 is constructed so that the base-side portion 43 of the to-be-engaged part 41 does not move in the vertical direction of FIG. 9.

Similarly, the packing 7 is constructed so that even if a force in the vertical direction is applied on the tip-side portion 45 (P2) of the to-be-engaged part 41 or the body 39 (P3), the tip-side portion 45 of the to-be-engaged part 41 or the body 39 of the packing 7 would not move in the vertical direction of FIG. 9.

Also, even if a force in the horizontal direction on the plane of paper of FIG. 9 (force in the direction of arrow A9b) is applied on the base-side portion 43 (P1) of the to-be-engaged part 41 of the packing 7, the base-side portion 43 is housed within the dovetail groove as shown in FIG. 10, so that the tip-side portion 45 of the to-be-engaged part 41 abuts on the surface S1 of the tip-side portion 49 of the engagement part 37, while the body 39 of the packing 7 abuts on the surface S2 of the body 35 of the packing accommodating recess 33. In this way, the packing 7 is constructed so that the base-side portion 43 of the to-be-engaged part 41 does not move in the horizontal direction on the plane of paper of FIG. 9.

Similarly, the packing 7 is constructed so that even if a force in the horizontal direction of FIG. 9 is applied on the tip-side portion 45 (P2) of the to-be-engaged part 41 or the body 39 (P3), the tip-side portion 45 of the to-be-engaged part 41 or the body 39 of the packing 7 would not move in the horizontal direction of FIG. 9.

In the above description, although the base-side portion 47 of the engagement part 37 of the packing accommodating recess 33 is shaped like a dovetail groove, the base-side portion 47 of the engagement part 37 of the packing accommodating recess 33 may be shaped like a T-shaped groove (see FIG. 17) or the other configuration, such as a combination of a T-shaped groove with a dovetail groove profile.

When viewing in the front-to-rear direction, additionally, the engagement part 37 of the packing accommodating recess 33 may be formed to have the other configuration (i.e. configuration where the width of the base-side portion 47 has a width narrower than that of the tip-side portion 49), such as a dovetail groove, in place of the T-shaped profile.

Next, an explanation will be made about another embodiment of the packing bellow. As shown in FIG. 12, the packing 7 comprises the body 39, the to-be-engaged parts (first to-be-engaged parts) 41 and second to-be-engaged parts 51.

As described above, the body 39 is shaped like an annulus resulting from a mutual connection between both longitudinal ends of the elongated cord-like member. The cross section of the above code-like member (i.e. section taken along a plane perpendicular to the longitudinal direction) is formed to have a predetermined configuration, such as a circular profile. Again, the annular body 39 is formed to be substantially rectangular when viewed in the front-to-rear direction. In other words, the body 39 (cord) is formed so that its center axis extends along four sides forming one rectangle.

There are provided a plurality of first to-be-engaged parts 41. The respective first to-be-engaged parts 41 project from the body 39 to the outside (or inside) of the body 39 shortly.

Also, there are provided a plurality of second to-be-engaged parts 51. The respective second to-be-engaged parts 51 also project from the body 39 to the outside (or inside) of the body 39 shortly.

In the to-be-engaged part 41 of the packing 7, additionally, the cross section of the tip-side portion 45 (i.e. section taken along a plane perpendicular to the projecting direction of the to-be-engaged part 41) is larger than the cross section of the base-side portion 43 (i.e. section taken along a plane perpendicular to the projecting direction of the to-be-engaged part 41). The multiple to-be-engaged parts 41 are substantially evenly spaced without being collectively arranged in a specific area of the body 39 in the longitudinal direction.

Again, each of the first to-be-engaged parts 41 and each of the second to-be-engaged parts 51 are respectively present outside (or inside, alternatively) die the body 39 in the expansion direction of an opening face 53 of the annular body 39. The opening face 53 of the body 39 is an oblong plane inside the rectangular (frame-shaped) body 39. The opening face 53 extends in both the transverse direction and the vertical direction.

Here, we now describe the packing accommodating recess 33 etc. more in detail.

As described before, the packing accommodating recess 33 includes the body 35 and the engagement parts (the first engagement parts) 37. Additionally, the packing accommodating recess 33 is provided with second engagement parts 55.

As shown in FIG. 8, the body 35 is frame-shaped when viewed in the front-to-rear direction. The cross section of the body 35 (i.e. section taken along a plane perpendicular to the extending direction of the body 35) is shaped like a rectangle.

In the first engagement part 37, the cross section of the base-side portion 47 (i.e. section taken along a plane perpendicular to the projecting direction of the first engagement part 37) is shaped like an isosceles trapezoid since the base-side portion 47 forms a dovetail groove, as shown in FIG. 10. The base-side portion 47 has a depth somewhat shallower than the depth of the body 35, as shown in FIG. 11.

In the first engagement part 37, the tip-side portion 49 is shaped like an oval when viewed in the front-to-rear direction, as shown in FIG. 9. The bottom surface of the tip-side portion 49 is on the same plane as the bottom surface of the base-side portion 47, as shown in FIG. 11.

In the first engagement part 37, the tip-side portion 49 has a width (dimension in the transverse direction) larger than the width (dimension in the transverse direction; width dimension of the bottom surface) of the base-side portion 47. Consequently, the first engagement part 37 is T-shaped when viewed in the front-to-rear direction.

The second engagement parts 55 are also depressed from the front face 31 of the flange part 25 rearward and formed in the front face 31 of the flange part 25.

The first engagement parts 25 project from two opposing sides of the frame-shaped body 35. Note, as two first engagement parts 37 are provided on one side, there are four first engagement parts 37 for two sides, in total. Additionally, when viewed in the front-to-rear direction, the four first engagement parts 37 are symmetrically arranged about a centerline extending in the transverse direction through the center of the body 35 and a centerline extending in the vertical direction through the center of the body 35.

Additionally, a semicircular or arching recess 57 is formed inside the body 35, corresponding to each of the first engagement parts 37. This recess 57 is to be utilized with an operator's finger when the packing 7 once placed in the packing accommodating recess 33 is detached from the packing accommodating recess 33. The recess 57 is formed so that its depth gets increased gradually as directing downward of FIG. 9.

The second engagement parts 55 project from the other two sides of the frame-shaped body 35 that oppose each other.

In the first to-be-engaged part 41 of the packing 7, the base-side portion 43 and the tip-side portion 45 are shaped like rectangular solids, as shown in FIGS. 13 to 15 etc. Respective widths of the base-side portion 43 and the tip-side portion 45 (dimensions in the transverse direction) are equal to each other. The dimension (height) of the tip-side portion 45 in the front-to-rear direction is larger than the dimension (height) of the base-side portion 43 in the front-to-rear direction. Consequently, the cross section of the tip-side portion 45 is larger than the cross section of the base-side portion 43. Note, the tip-side portion 45 projects from the base-side portion 43 on one side (front side) in the direction of height. Additionally, a chamfer 59 is formed on one ridge of the tip end of the tip-side portion 45.

The second to-be-engaged part 51 of the packing 7 comprises a base-side portion 61 and a tip-side portion 63. The tip-side portion 63 is formed with a small-diameter part 65 and a large-diameter part 67.

Then, under condition that the packing 7 is accommodated in the packing accommodating recess 33, the first to-be-engaged parts 41 of the packing 7 are engaged with the first engagement parts 37 of the packing accommodating recess 33, while the second to-be-engaged parts 51 of the packing 7 are engaged with the second engagement parts 55 of the packing accommodating recess 33. The cross section of the engagement part 55 is T-shaped like shown in FIG. 17. Consequently, the packing 7 and the shell 11 are substantially integrated with each other. Further, the to-be-engaged parts 41, 51 of the packing 7 are substantially housed in the packing accommodating recess 33. On the other hand, the body 39 of the packing 7 partially projects from front face 31 of the flange part 25 somewhat forward, as mentioned before.

Under condition that the first to-be-engaged part 41 of the packing 7 is engaged with the first engagement part 37 of the packing accommodating recess 33, the base-side portion 43 of the first to-be-engaged part 41 is elastically deformed and integrated with the flange part 25, as mentioned before and also shown in FIG. 10.

Under condition that the second to-be-engaged part 51 of the packing 7 is engaged with the second engagement part 55 of the packing accommodating recess 33, the large-diameter part 67 of the tip-side portion 63 is fitted in the second engagement part 55 of the packing accommodating recess 33, so that the second to-be-engaged part 51 is integrated with the flange part 25.

When the shell 11 is mounted on the casing 23 by the bolts 29, the body 39 of the packing 7 is pressed into elastic deformation, as mentioned before. As a result, the interior side (e.g. the LA terminals 5 etc.) of the body 39 of the packing 7 is sealed between the joint surface of the flange part 25 of the shell 11 and the joint surface of the casing 23.

According to the packing attachment structure 1, it is constructed so that the to-be-engaged parts 41 of the packing 7 fit into the engagement parts 37 of the packing accommodating recess 33 and engaged with the engagement parts 37 under condition that the packing 7 is accommodated in the packing accommodating recess 33. Thus, even if the structure is subjected to an external force through an operator's finger etc. during transporting or assembling operation of the connector 3, there is no possibility that the packing 7 is detached from the shell 11. Alternatively, even so, the packing will be hardly detached from the shell. Accordingly, with improved performance and quality of the connector 3, it is possible to win a customer's trust.

Further, according to the packing attachment structure 1, it is constructed so that the packing accommodating recess 33 includes the annular body 35 and the engagement part 37 projecting from the body 35 in the one-plane direction of the front face 31 of the flange part 25, and the whole packing accommodating recess 33 is formed on one plane. Thus, different from the structure shown in Patent Literature 1, the engagement part 37 of the packing accommodating recess 33 does not project laterally and makes no hindrance. Additionally, even if accidentally striking the shell 11 against something or some such accident, it becomes difficult for the packing accommodating recess 33 and the packing 7 to be broken by such an accident.

Still further, according to the packing attachment structure 1, as the width of the base-side portion 47 of the engagement part 37 of the packing accommodating recess 33 becomes wider at a deeper point in the packing accommodating recess 33 and narrower at a shallower point in the packing accommodating recess 33, the base-side portion 43 of the to-be-engaged part 41 of the packing 7 is prevented from moving forward, so that it becomes difficult for the body 39 of the packing 7 to be detached from the packing accommodating recess 33, more certainly.

That is, even if the body 39 of the packing 7 tries to move forward under condition that the packing 7 is accommodated in the packing accommodating recess 33, the base-side portion 43 of the to-be-engaged part 41 of the packing 7 is prevented from moving forward. Therefore, there is no possibility that moment is produced about the to-be-engaged part 41 of the packing 7, so that the body 39 of the packing 7 does not move forward. Suppose here, not the base-side portion 43 but the tip-side portion 45 of the to-be-engaged part 41 of the packing 7 is prevented from moving forward. In such a case, if the body 39 of the packing 7 tries to move forward, moment is produced about the to-be-engaged part 41 of the packing 7, so that the body 39 of the packing 7 may move forward.

In the packing attachment structure 1, the cross section of the base-side portion 47 of the engagement part 37 of the packing accommodating recess 33 may be formed to have a T-shaped profile, as mentioned above and also shown in FIG. 17. In this case, the base-side portion 43 of the to-be-engaged part 41 of the packing 7 may be formed to have a T-shaped cross section, as shown in FIG. 17(a). Alternatively, the base-side portion 43 of the to-be-engaged part 41 of the packing 7 may be formed to have a V-shaped cross section, as shown in FIG. 17(b).

The invention claimed is:

1. A packing attachment structure comprising:
   an attachment member abutted on a butt surface of a mating member, the attachment member having a flange part and a packing accommodating recess formed on a front face of the flange part; and
   a packing accommodated in the packing accommodating recess that seals a boundary between the mating member and the flange part, the packing made of elastic material,
   wherein the packing accommodating recess includes an annular body and an engagement part projecting from the annular body on a plane of the front face of the flange part and also in the one-plane direction of the front face of the flange part,
   the packing includes an annular body and a to-be-engaged part projecting from the annular body of the packing in a plane parallel to a plane of the packing, wherein the to-be-engaged part includes a tip side portion projecting perpendicularly from the plane of the packing at a tip end of the to-be-engaged part, and the to-be-engaged part has a constant width parallel to the plane of the packing, and
   when the packing is accommodated in the packing accommodating recess, the annular body of the packing is accommodated in the annular body of the packing accommodating recess while the to-be-engaged part of the packing fits into the engagement part of the packing accommodating recess and then is engaged with the engagement part,
   wherein a base-side portion of the engagement part is formed as a dovetail groove,
   wherein a base-side portion of the to-be-engaged part is formed in a shape other than a dovetail shape,
   wherein the base-side portion of the to-be-engaged part and the dovetail groove of the base-side portion of the engagement part are sized such that the base-side portion of the to-be-engaged part is housed within the dovetail groove, and opposing walls of the dovetail groove bear against and deform the base-side portion of the to-be-engaged part, and
   wherein the base-side portion of the to-be-engaged part of the packing is pressed and elastically deformed by the opposing walls of the base-side portion of the engagement part at a shallower point of the engagement part of the packing accommodating recess.

2. The packing attachment structure of claim 1, wherein when the packing is accommodated in the packing accommodating recess, the base-side portion of the to-be-engaged part of the packing is prevented from moving from the flange part forwardly.

3. The packing attachment structure of claim 1, wherein a dimension of the tip-side portion of the to-be-engaged part in a front-to-rear direction is larger than a dimension of the base-side portion of the to-be-engaged part in the front-to-rear direction.

* * * * *